United States Patent [19]
Wainscott

[11] Patent Number: 4,917,343
[45] Date of Patent: Apr. 17, 1990

[54] ADJUSTABLE SUPPORT

[75] Inventor: Ross B. Wainscott, Feilding, New Zealand

[73] Assignee: READ-EZE Systems Limited, Lower Hutt, New Zealand

[21] Appl. No.: 110,037

[22] Filed: Oct. 14, 1987

Related U.S. Application Data

[63] Continuation of Ser. No. 907,820, Sep. 16, 1986, abandoned.

[30] Foreign Application Priority Data

Sep. 16, 1985 [NZ] New Zealand .......................... 213481
Oct. 25, 1985 [NZ] New Zealand .......................... 213967

[51] Int. Cl.⁴ ............................................. A47B 65/00
[52] U.S. Cl. ................................. 248/447.2; 248/451;
248/284; 248/454; 403/97; 403/146
[58] Field of Search .................... 248/447.2, 447, 451,
248/458, 291, 284, 289.1, 454, 456, 276, 288.1;
403/97, 146, 380; 40/357, 352

[56] References Cited

U.S. PATENT DOCUMENTS

| 376,593 | 1/1888 | Greenawalt | 248/447 |
|---|---|---|---|
| 502,601 | 8/1893 | Anderson et al. | 248/276 X |
| 1,028,097 | 6/1912 | Colleen | 40/357 |
| 1,354,873 | 10/1920 | Bartley et al. | 248/276 X |
| 1,899,759 | 2/1933 | Kavanaugh | 40/357 |
| 1,932,697 | 10/1933 | Jankovic | 403/97 |
| 2,923,991 | 2/1960 | Brazee | 248/447 |
| 4,186,905 | 2/1980 | Brudy | 248/289.1 X |
| 4,582,445 | 4/1986 | Warshawsky | 403/97 |

FOREIGN PATENT DOCUMENTS 132331 7/1929 Switzerland .......................... 40/357

Primary Examiner—Ramon S. Britts
Assistant Examiner—Karen J. Chotkowski

[57] ABSTRACT

An adjustable support has two adjustable support members 6, 11. A spring 17 mounted on pin 8 biases members 6, 11 together so that the peripheral and bevel teeth 7, 405 and 16, 406 engage to lock the members 6, 11 together at a required position. When member 11 is to be moved relative to member 6, lateral movement of member 11 against the bias of spring 17 enables the teeth 7, 405, 16, 406 to be disengaged and member 11 to be rotated to the required position for the article support arm 3.

4 Claims, 7 Drawing Sheets

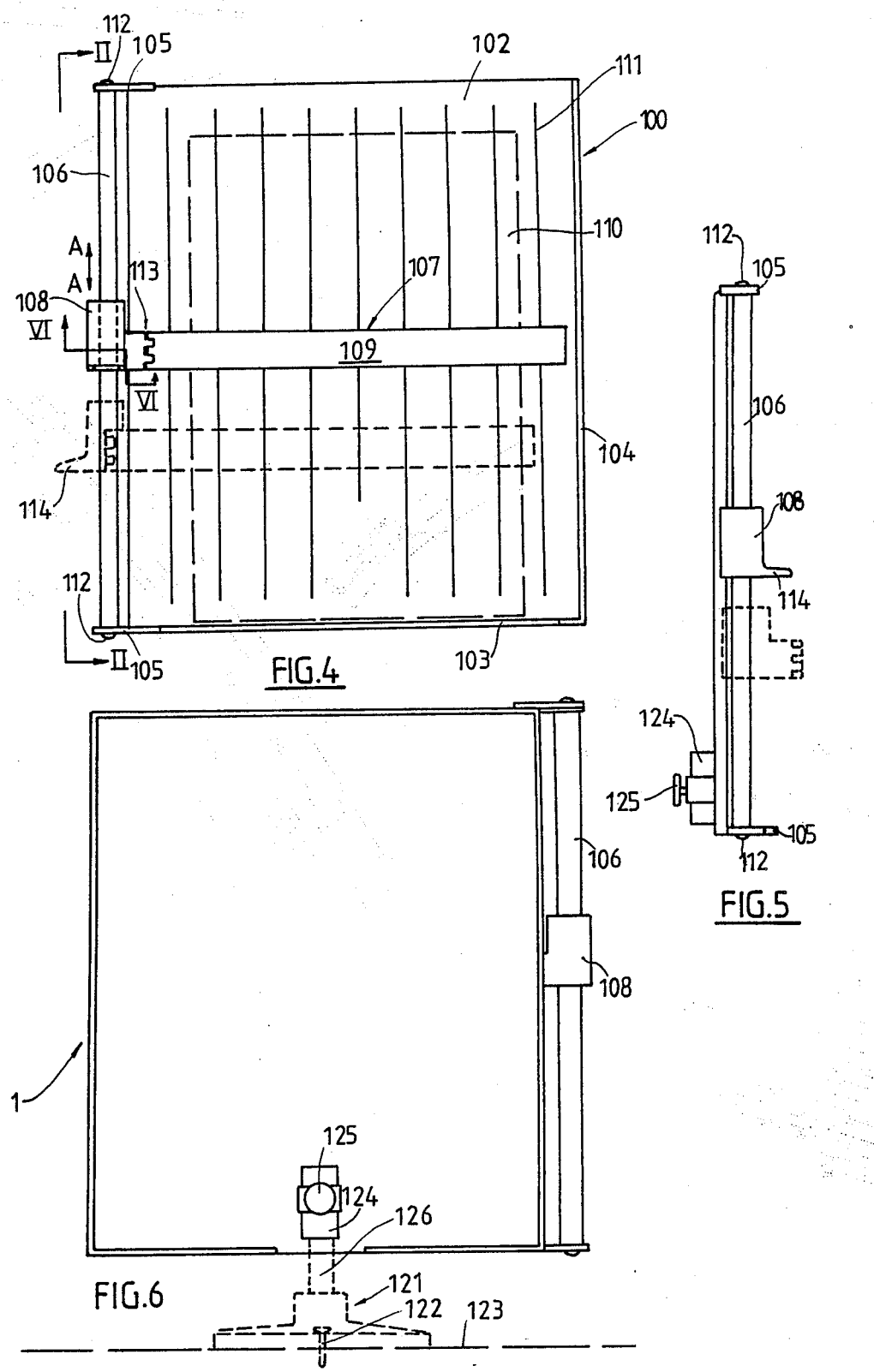

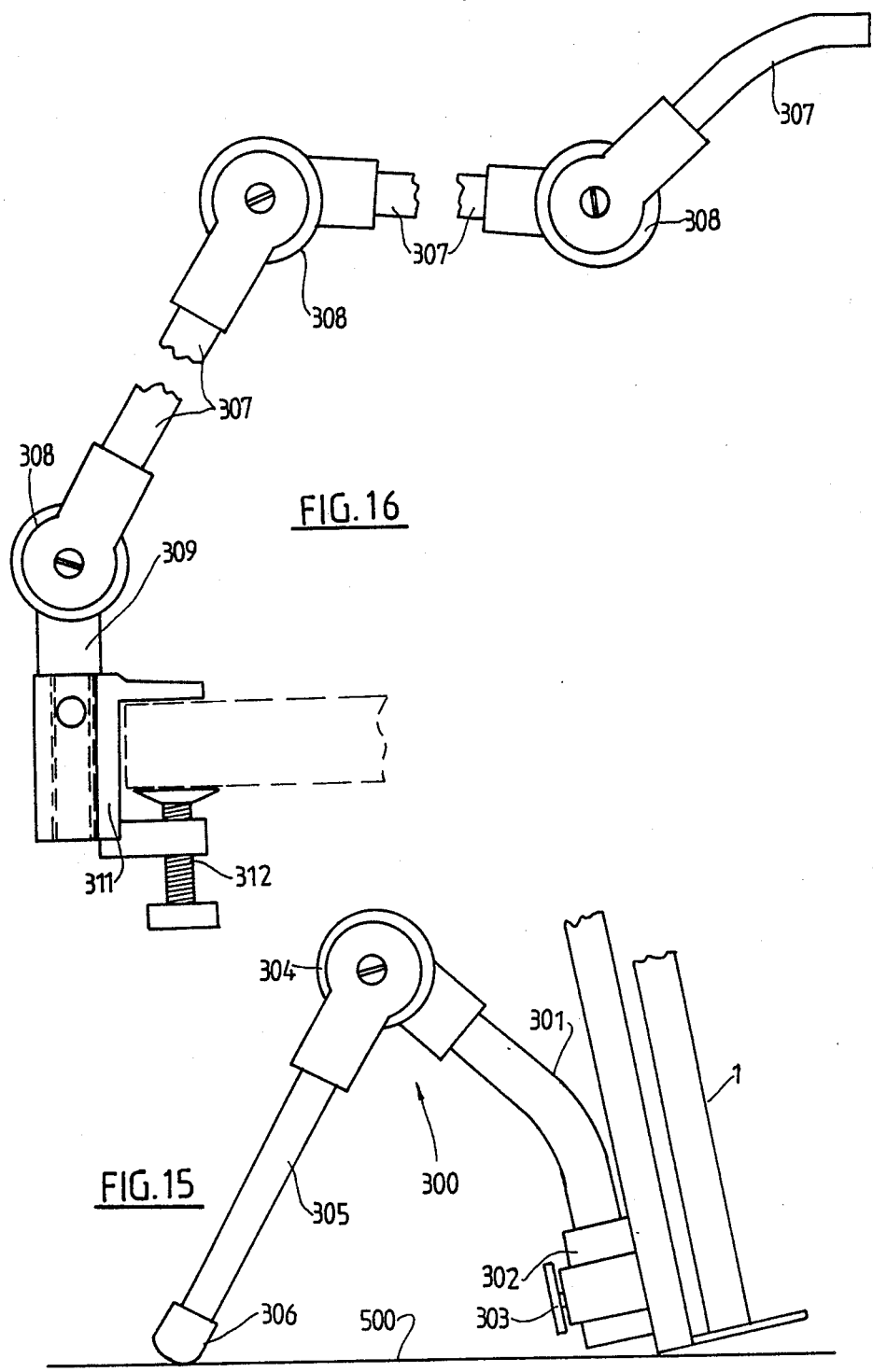

ADJUSTABLE SUPPORT

This application is a continuation of application Ser. No. 907,820 filed on Sept. 16, 1986 and now abandoned.

BACKGROUND OF THE INVENTION

1. Field of the Invention

This invention in one embodiment relates to improvements in and relating to adjustable supports and more particularly but not exclusively to adjustable supports suitable for use in holding, at a desired angle, items of office equipment.

In one particular application of the adjustable support of the present invention it may provide a desired angle of operation for a document holder, known as a "copy holder" used by computer operators and typists for holding written documents as the keyboard work is being effected. However, innumerable uses of the invention will become apparent to those skilled in the engineering arts such as use for folding benches, electrical appliances such as fans and heaters, and furniture for example.

2. Description of Background Art

To the present time adjustable supports or stands have typically used a swivel joint consisting of a ball joint about which the support can swivel or a screw threaded arrangement whereby adjacent surfaces of a swivel joint can be clamped together when a desired position has been achieved.

Typically, the ball joint type arrangement becomes ineffective due to wear on the ball surface while with the clamping arrangement the continual clamping and releasing of the abutting surfaces can frequently result in stress fractures of the material occurring.

The present invention in another embodiment thereof also relates to an improved document holder.

To the present time various difficulties have been experienced with document holders which are required by secretaries, data processors and the like to hold a document while it is being worked on at the typewriter or computer terminal for exammple. Other instances where document holders are used are of course where a document is to be held merely for it to be read e.g. as a book or magazine holder.

A major difficulty with document holders available at the present time has been the effective retention in a desired place of the cursor i.e. the transverse bar which traverses the document from top to bottom. Another disadvantage of existing document holders has been the inability of the cursor to accommodate various thicknesses of document.

OBJECT OF THE INVENTION

It is thus an object of one embodiment of the present invention to provide an adjustable support which overcomes or at least obviates disadvantages of adjustable supports available to the present time.

It is an object of another embodiment of the present invention to provide a document holder which overcomes or at least obviates the aforementioned disadvantages in document holders available to the present time.

Further objects of this invention will become apparent from the following description.

SUMMARY OF THE INVENTION

According to one aspect of the present invention there is thus provided an adjustable support comprising a first support means, biasing means biasing a second support means into abutting relationship with said first support means, engagement means locking said first and second support means together when in said abutting relationship, mounting means provided for at least said second support means which enable said second support means to be disengaged from said abutting relationship with said first support means at a first position and against the bias of said biasing means and which further enable said second support means to be moved to a new position relative to said first support means before said biasing means returns said second support means to said abutting relationship.

According to a further aspect of the present invention there is provided apparatus having at least two parts and wherein an adjustable support as hereinabove defined is provided therebetween so that said parts are movable relative one with the other into a plurality of fixed positions.

According to a further aspect of the present invention there is provided in combination a document holder and an adjustable support as hereinabove defined, said document holder including a cursor having an end portion slideable along a support member provided on said document holder, an elongate cursor means extending outwardly from said end portion to extend across a document held by said document holder, a hinging means provided between said end portion and said arm portion wherein the spacing apart of said arm portion from said document holder can be varied.

According to another aspect of the present invention there is thus provided a cursor for a document holder wherein said cursor comprises an end portion slideable along a support means provided on said document holder, an elongate cursor means extending outwardly from said end portion to extend across a document held by said document holder, a hinging means provided between said end portion and said arm portion whereby the spacing apart of said arm portion from said document holder can be varied.

According to a still further aspect of the present invention there is provided a cursor for a document holder wherein said cursor comprises an end portion slideable along a support member provided on said document holder said end portion having an aperture therethrough to loosely accommodate said support member, said aperture accommodating a split bearing member which frictionally engages about said support member to retain said end portion at a desired position along said support member.

Further aspects of this invention which should be considered in all its novel aspects will become apparent from the following description given by way of example of possible embodiments thereof and in which reference to made to the accompanying drawings wherein:

BRIEF DESCRIPTION OF THE DRAWINGS

FIG. 1A: shows a part cross-sectional view of one of the adjustable support members of FIG. 1 along arrows I—I;

FIG. 4: shows very diagrammatically a front view of a document holder including a cursor according to one embodiment of the invention;

FIG. 5: shows a view along arrows II—II of FIG. 4;

FIG. 6: shows a rear view of the document holder of FIGS. 4 and 5 with one possible type of stand therefor indicated in outline;

FIG. 15: shows diagrammatically a side perspective view of a document holder with a further type of adjustable support fitted according to another embodiment of the invention;

FIG. 16: shows diagrammatically a further type of adjustable support according to another embodiment of the invention.

DETAILED DESCRIPTION OF ILLUSTRATED EMBODIMENTS

As mentioned above, there are innumerable situations where parts or components of apparatus need to be able to move between two or more positions at which they are securely locked together. There are, therefore, two conflicting design characteristics namely the securement of the locking together of the parts at the fixed positions and the ease with which they can be released and moved to a new position. In the past, to enhance one characteristic has required a weakening of the other characteristic.

The present invention, however, in a simple yet effective manner has been able to achieve an adjustable support which provides both a secure locking of the moving parts together at a plurality of fixed positions and a simple and effective release of the parts from their fixed positions so that they can move to a new position.

Figure 1:
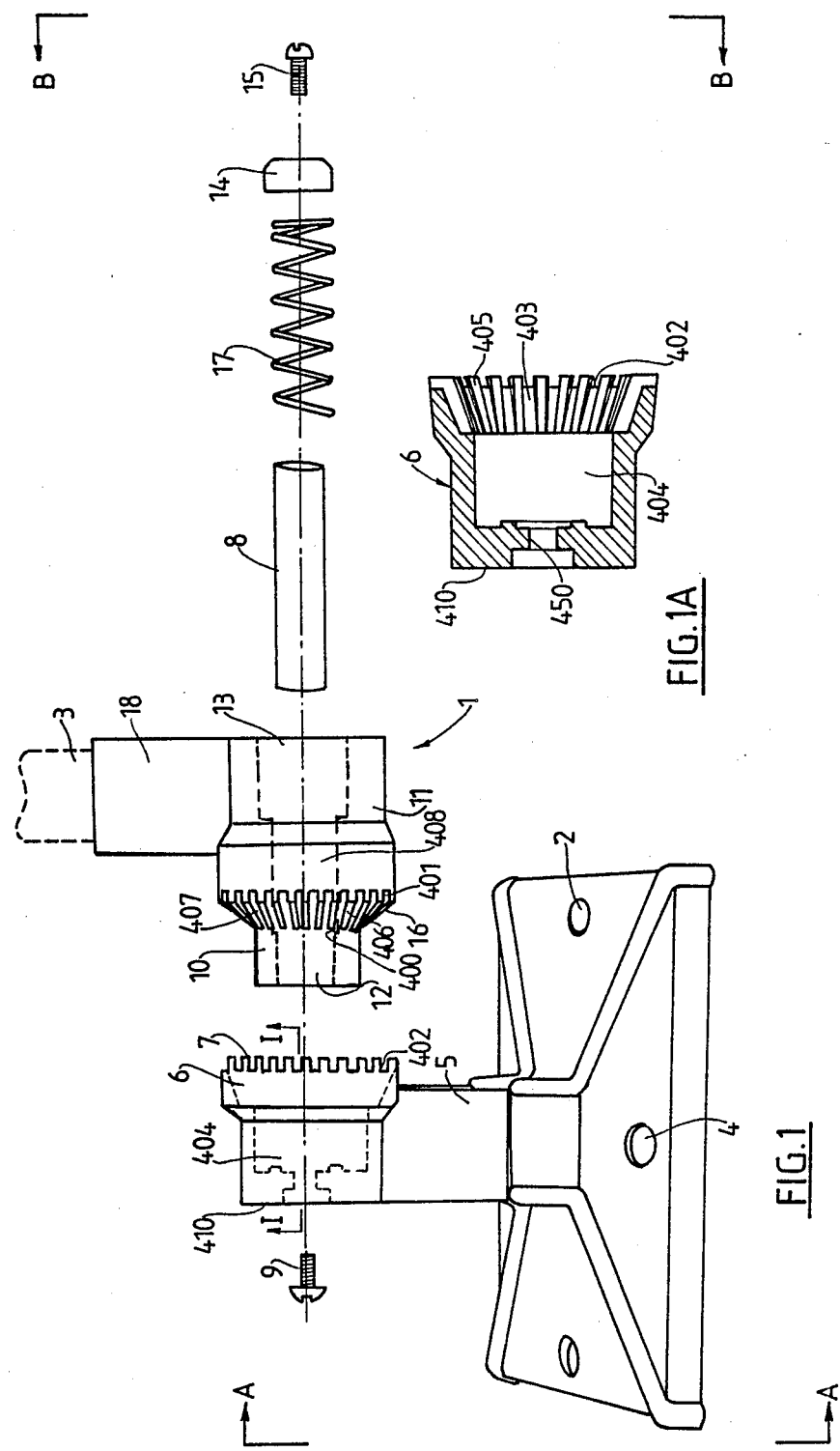
FIG. 1: shows an exploded view of an adjustable support according to one embodiment of the invention.
Figures 2, 3:
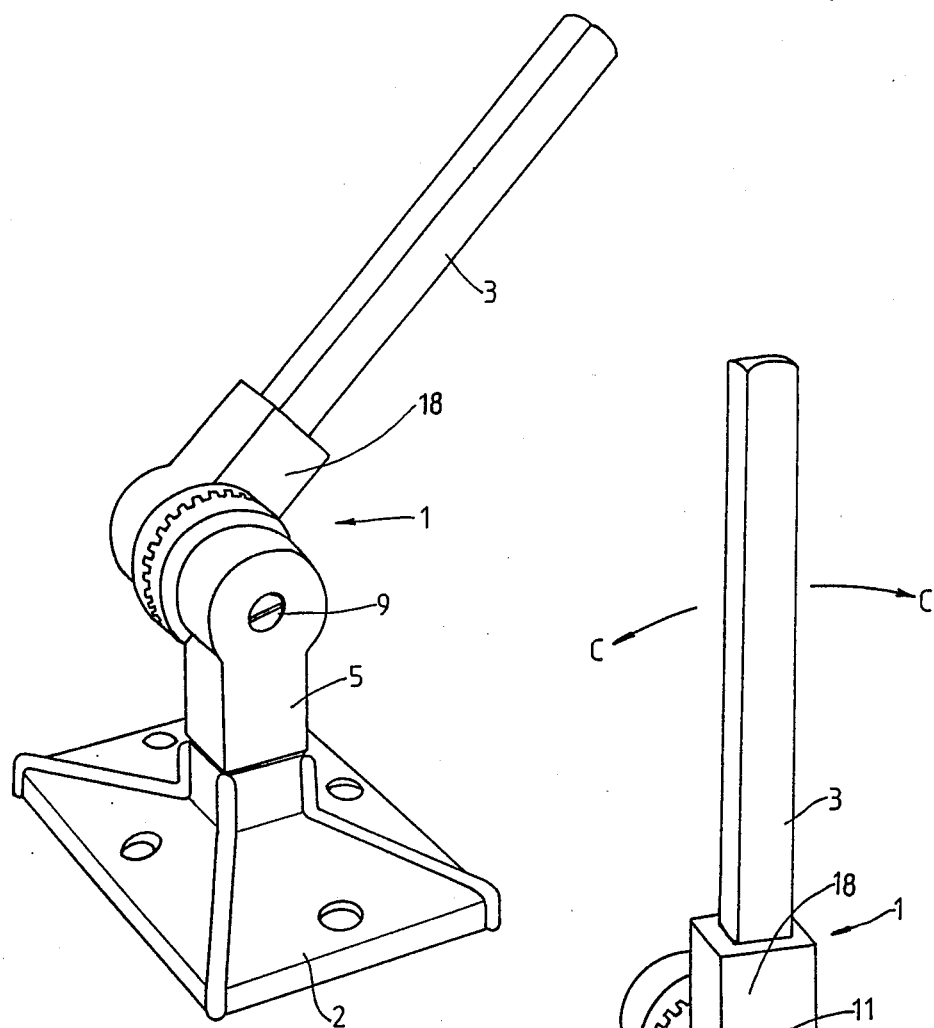
FIG. 2: shows a view along arrows AA of FIG. 1 of an assembled adjustable support.
FIG. 3: shows a view along arrows BB of FIG. 1 of an assembled adjustable support.

In one embodiment of the invention shown in FIGS. 1 to 3 of the accompanying drawings an adjustable support is indicated generally by arrow 1. In the exmaple shown, the desired relative movement is between a fixed base or support plate 2 and an elongate support member 3. This embodiment of the invention would, therefore, be appropriate for example for a disk lamp secured on the desk by means of screws passing through the apertures 4 in the plate 2 and with the adjustable lamp mounted on the equivalent of the elongate arm 3. Other examples which will spring to mind will be the mounting of a copy holder on one, or between a pair, of the arms 3 or their equivalent with one or more of the base plates 2 screwed onto the computer operator's or secretary's desk or alternatively with the one or more plates 2 replaced by suitable clamps for example.

The plate 2 has an upstanding portion 5 provided thereon or associated therewith (i.e. it can be an integral part of the base 2 or a discrete component), the upstanding portion 5 leading to a substantially hollow support member 6 having a plurality of engagement means, shown as teeth 7 about its peripheral edge 402. As particularly shown in FIG. 1A, these teeth 7 extend into the interior of the support member 6 20 as to form part of a frusto-conical circular recess 403, the bevelled teeth within the recess being indicated as teeth 405. An elongate pin 8 extends within the member 6 and through recess 403 and a smaller diameter bore 404. One end of the pin 8 is engaged within an apertured flange 450 and held there by means of a screw or the like 9 secured through the rear face 410 of the member 6

A projecting portion 10 of a second support member 11 can fit within the recess 403 of member 6. The bore 12 in the projecting portion 10 of member 11 accommodates the pin 8. The snug-fitting accommodation of the pin 8 within the bore 12 enables the rotatable mounting of the member 11 relative to the member 6. An enlarged bore 13 at the rear surface of the member 11 accommodates a cover disc 14 which fits over the other end of the pin 8 and is connected thereto by a screw 15 or the like engaging with a threaded aperture in the end of pin 8. The member 11 has engagement means comprising a plurality of teeth 16 along its peripheral edge 401, which teeth 16 extend downwardly and inwardly to form a bevelled gear 406 along a frusto-conical portion 407 of member 11. The teeth 16 and 406 are able to respectively engage with the teeth 7 and 405 of the member 6.

A spring 17 is positioned about the pin 8 and is accommodated within the bore 408 in the member 11. The spring 17 is compressed between the flange 400 at the end of the bore 408 and the cover disc 14.

When a new position for the member 11 relative to the member 6 is required, this can be readily achieved by lateral movement of the member 11 away from member 6 and against the bias of the spring 17 so that the teeth 7, 405 and 16, 406 disengage. The lateral movement being in the direction of the arrow 19 in FIG. 3 the movement is caused by pressure in that direction against the knob 14 which moves within the enlarged bore 13 to thereby disengage the teeth. At this time the arm 3 can be moved as indicated by the arrows CC in FIG. 3 to a new position when the bias of the spring 17 can be allowed to re-engage the teeth 16, 406 and 7, 403 so that the new locked position is achieved. It is to be appreciated that each pair of teeth 7, 405 and 16, 406 will define a possible fixed position. While a relatively large number of teeth 7, 405 and 16, 406 are shown, of course in an alternative embodiment one of the members 6 and 11 could for example have just a single projection or indent forming part of the engagement means while the other of the members could have for example just a pair of recesses or projections forming the other part of the engagement means so that just a pair of fixed positions can be achieved. This may be all that is required in certain types of apparatus.

The member 11 is shown having a projecting portion 18 to accommodate the elongate arm 3. A locking screw or the like (not shown) may extend through the portion 18 to lock with the bottom end of the arm 3 if required. It will be appreciated of course that the drawings are by way of diagrammatic illustration only and that the arm 3 and the member 11 could for example be integrally formed e.g. by casting or moulding so as for example to form the adjustable leg of a chair or the light support fitment of a desk lamp.

In one embodiment of the invention the members 2, 5, 11 and 14 may be moulded or cast from suitable plastics or metal material as discrete inter-engaging components. It is to be appreciated, however, that the adjustable support of the present invention may be formed from any suitable materials and by any suitable process or technique depending on the application required for the adjustable apparatus. It is also stressed that, as mentioned above, both of the movable members may have base plates or the like 2 so that for example two parts of an item of furniture can be moved relative one with the other or alternatively both moving parts could for example have a member such as 11 provided with or adapted to be provided with an elongate arm of the like 3.

The present invention in another embodiment also broadly resides in a cursor for a document holder and in a document holder incorporating such an improved cursor.

This embodiment of the invention will now be described and with reference particularly to FIGS. 4–11 of the accompanying drawings.

It is emphasised however that that is illustrative merely of one possible embodiment of the invention and moreover it will be readily apparent to those skilled in the engineering arts that the present invention may be put to other uses, for example, on a drafting board and the like.

Referring therefore to FIGS. 4–11, a document holder is referenced generally by arrow 101 and is shown comprising a substantially flat, document support surface, 102, having a lower document support ledge, 103, and a side document support ledge 104.

An opposite vertical edge of the surface 102 is shown provided with a pair of support portions, which may be discrete brackets, 105 supporting a substantially vertical support rod 106. A cursor referenced generally by arrow 107 has an end portion 108, which is able to slide along the support member 106 to a desired position of the arm member 109 of the cursor 107. The arm member 109 extends over the document 110, shown in outline in FIG. 4, in position on the surface 102.

The surface 102 is shown with a series of vertical ribs 111 to assist in retaining the document in position on the surface 102. The surface 102, raised edge 104, outwardly extending bottom ledge 103 and support portions or brackets 105 may for example be moulded from a plastics material as an integral unit. Alternatively a composite structure of various components may be utilized of varying materials.

The rod 106 may for example be a metal or plastics rod held between brackets 105 by screws 112. The cursor 109 can thus slide up and down the support member 106 as indicated generally by the arrows A—A. However, it is necessary that the top edge of the arm 109 remains substantially parallel with the plane of the surface 102. This has in the past been impossible to achieve in one size of a document holder in respect of varying thicknesses of documents.

In the present invention however it is seen that the end portion 108 is provided with hinge means 113, connecting it with the arm 109. When a relatively thick document is required to be held on the document holder 101, end portion 108 is rotated. This rotation is facilitated by a projecting portion 114 which may be gripped so that the arm 109 can be pivoted relative to the end portion 108 about the hinge 113 to the position shown in dotted lines in FIG. 4. This is also shown in full line in FIG. 8 where a relatively thick document 114 is shown in position.

A further advantage of the present invention is that in various instances the arm member 109 is not required eg. where an operator is merely using the document holder as a support for a bundle of documents which are being sequentially read and removed. As shown in outline in FIG. 7, the present invention enables the end portion 108 to be rotated so that arm 109 can extend away from the surface 102 for this purpose.

Figure 9:
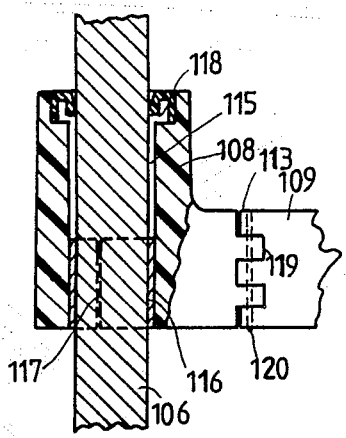
FIG. 9: is a partial cross-sectional view along arrows VI—VI of FIG. 4.
Figures 10, 11:
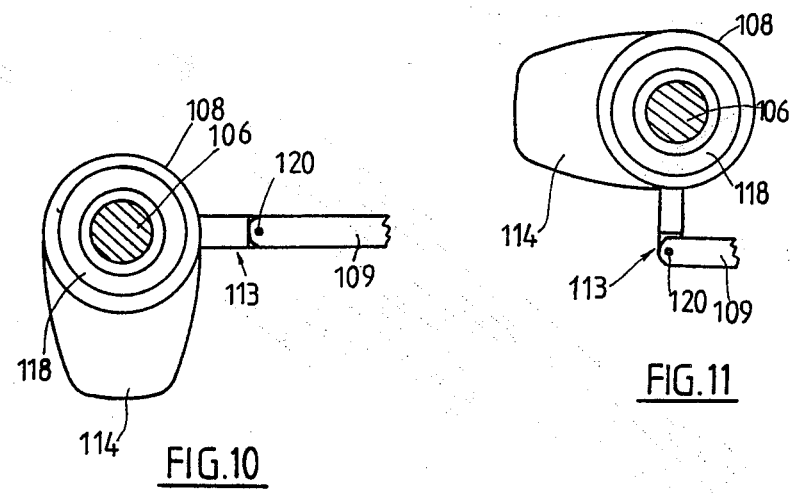
FIGS. 10 and 11: show respectively view along arrows VII—VII and VIII—VIII of FIGS. 4 and 5.

As seen particularly in FIGS. 9 to 11, the retention of the end portion 108 at a desired position on the support member 106 is achieved by the end portion 108 having a bore 115 therethrough. The bore 115 accommodates a bearing member 116 which is shown in the form of a bush having a longitudinal slit 117 therein. This bush 116 provides a frictional but slideable engagement at the end portion 108 with the support member 106 but at the same time locating the end portion 108 at the desired position on the support member 106. The inner surface of the bush 116 may be coated with PTFE or the like if required. The bore 115 is shown enlarged at its upper end ot accomodate a seal member 118 suitably of rubber or plastic. The seal 118 is a snug fit engaging about the support member 106. The end member 108 can thus be slid along the support member 106 to a desired position. To accommodate a particular thickness of document, the arm member 109 can then be pivoted by means of the hinge 113 about the end portion 108. As illustrated in FIG. 9, the hinge 113 may be simply provided by inter-engaging apertured tongues, 119, through which a pivot pin or the like 120 may be engaged.

Figure 7:
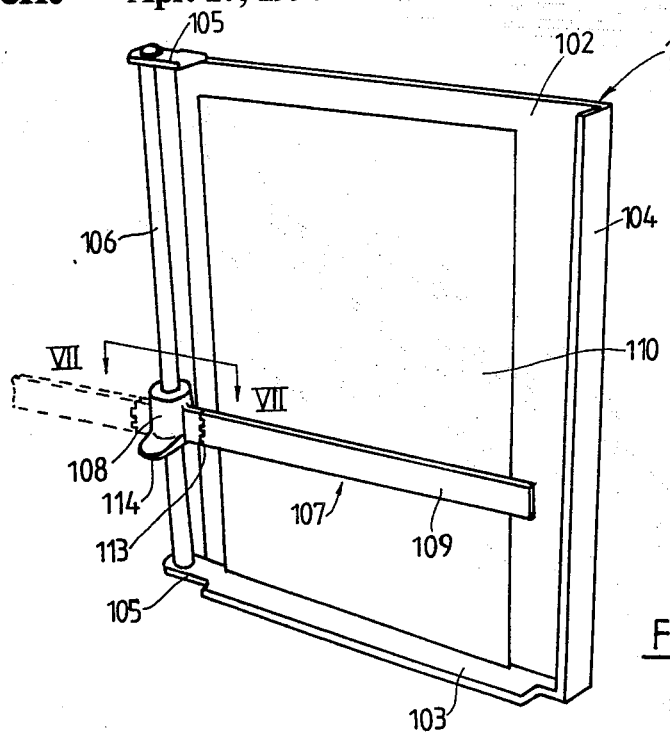
FIG. 7: shows a side perspective view of the document holder of FIG. 4 with the cursor both in a full line position and in an alternative position shown in outline.
Figure 8:
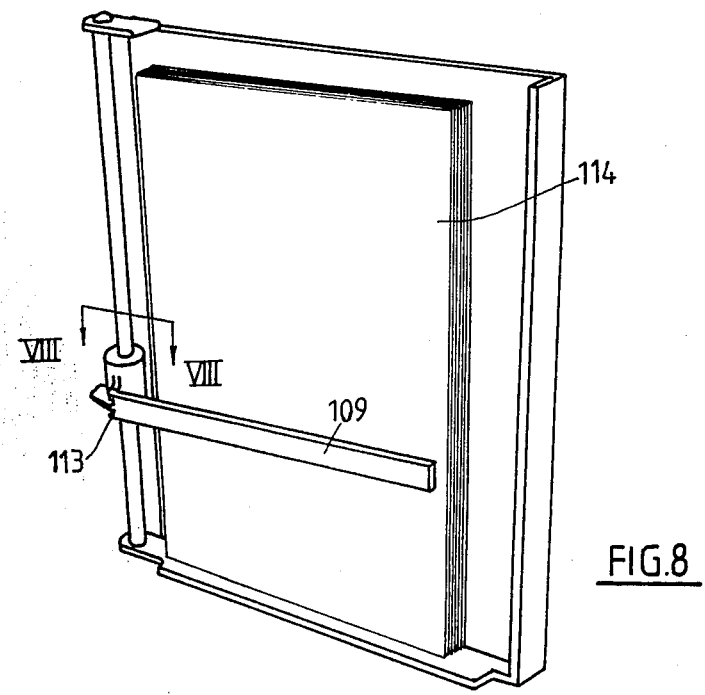
FIG. 8: shows the document holder of the preceding figure but with the cursor hinged so as to accommodate a larger document.

The operation of the hinge 113 is particularly well illustrated in FIGS. 10 and 11 showing the movement of the arm 109 between the positions shown in FIGS. 7 and 8.

The document holder of this embodiment of the present invention may be used in conjunction with any suitable type of base or support depending largely on the task which the document holder is to perform. Thus, in FIG. 6 a base 121 is illustrated in outline with a screw or nail 122, securing it to a work-surface 123. The rear of the document holder 101 is shown provided with a clamp or the like 124, with a rotatable clamping screw 125, to engage with a support member 126, of the base 121.

Figure 12:
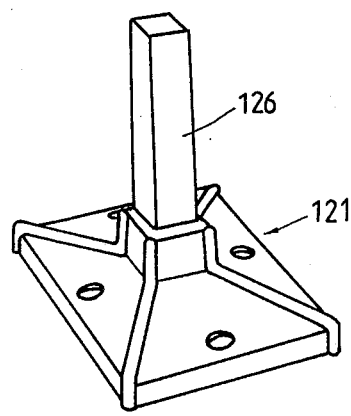
FIGS. 12 13 and 14: show respectively various types of bases which may be used in conjunction with the document holder of the preceding figures.

The base shown in outline in FIG. 6 is shown in full line in FIG. 12 by way of example.

Figure 13:
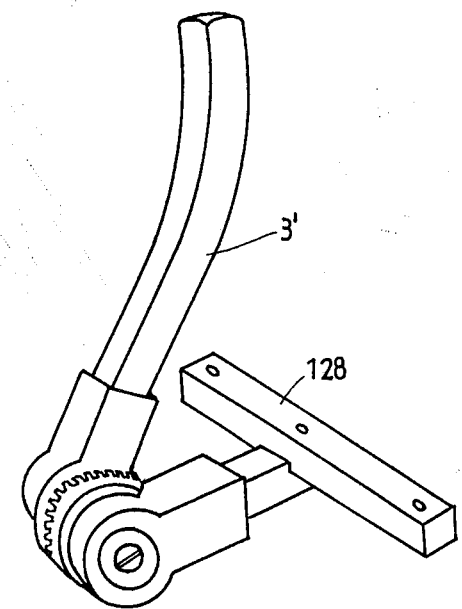

The support 128 shown in FIG. 13 may be a modification of the base of FIG. 1 in having a transverse support bar 128 which may be screwed or otherwise secured to a work station and which may have a curved support bar $3^1$ for connection with the document holder.

Figure 14:
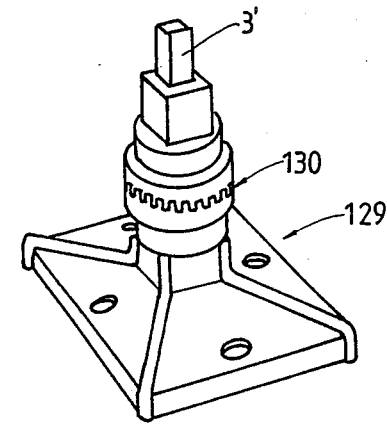

In the base shown in FIG. 14, the base 129 may be substantially that shown in FIG. 1. The support rod $3^1$ and thus a document holder supported thereon can be rotatable relative to the base 129 by means of a movable adjustment 130 such as described with reference to FIGS. 1 to 3. However in this embodiment as shown the adjustment is about a vertical axis not about a horizontal axis.

Referring now to FIG. 15, the document holder 1 is shown provided with another embodiment of an adjustable support 300. This is shown comprising a bent over support arm 301 which is shown entering into the top of the clamp 302 having a rotatable clamping screw 303. The arm 301 extends at its other end to an adjustable support 304 such as has been previously described with reference to FIGS. 1 to 3 for example. Extending outwardly and downwardly from the adjustable support 304 is shown a further support arm 305 which is shown ending in a resilient cover member 306, suitably of rubber or plastics. It is seen that by separating and twisting the relatively rotatable members of the adjustable support 304 the angle of inclination of the support arm 305 can be adjusted relative to the working surface 500 on which the cover member 306 sits. A corresponding change of attitude of the document holder 1 can thus be speedily and effectively achieved.

Referring now to FIG. 16, a multiple linkage adjustable support is shown by way of example including support arms 307 interconnected by adjustable supports 308 such as hereinbefore described with reference to previous embodiments of the invention. A base support member 309 extends into a clamp member 311 having a clamping means 312 whereby the clamp member 311 can be fixed to any required surface. The document holder or other item, of electrical equipment for example, can be secured at the end of the outermost support arm 307 with the multiple supports 308 providing an infinite variety of positions for the item concerned.

Where in the aforegoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope of the invention as defined in the appended claims.

I claim:

1. An adjustable support comprising:
a first support means;
a second support means operatively disposed adjacent to said first support means;
a spring under compression biasing said second support means into abutting relationship with said first support means;
engagement means positioned between the first and second support means in the form of a first set of teeth provided radially about an inner peripheral edge of a frusto-conical recess portion of said first support means and a second set of teeth engageable with said first set and provided radially about an inner peripheral edge of a frusto-conical projection of said second support means, said first and second sets of teeth locking said first and second support means together when in said abutting relationship and said frusto-conical recess of said first support means including an inner bore and said frusto-conical projection of said second support means including a projecting portion which when in said abutting relationship fits within said inner bore of the first support means;
mounting and operating means being provided which enable said first and second support means to be disengaged from said abutting relationship against the bias of said spring, the mounting and operating means having a pin one end extending through a bore in said second support means to contact said first support means, the pin within the bore having thereon said spring one end of which contacts a flange portion within said bore in said second support means, the other end of said spring contacting a cover knob on the other end of the pin, the cover knob substantially filling an open end of the bore for concealing said spring within said bore, the mounting and operating means being fixed relative to the first support means wherein manual pressure applied axially to the second support means causes the second support means to laterally move relative to the first support member to thereby release the first and second sets of teeth from engagement thus allowing rotational movement of the first and second support means relative to each other to a new position in which release of the axial pressure allows said spring to return said second support means to said abutting relationship.

2. The adjustable support according to claim 1, wherein at least said second support means is provided with an outwardly extending substantially hollow portion to accommodate therein one end of a support arm the other end of which is connected with an article to be supported.

3. The adjustable support according to claim 1, and further including a document holder as the article to be supported, said document holder including a cursor having an end portion slidable along a support member provided on said document holder, an elongate cursor means extending outwardly from said end portion to extend across a document when held by said document holder, a hinging means provided between said end portion and an arm portion of the elongate cursor means wherein the spacing apart of said arm portion from said document holder can be varied.

4. The adjustable support according to claim 3, wherein said end portion has an aperture therethrough to loosely accommodate said support member, said aperture accommodating a split bearing member for frictionally engaging said support member while being selectively slidable thereon to retain said end portion at a desired position along said support member.

* * * * *